(12) United States Patent
Martinez Cerezo et al.

(10) Patent No.: US 7,597,772 B2
(45) Date of Patent: Oct. 6, 2009

(54) TUBULAR COMPONENTS FOR AERONAUTICAL FUSELAGES AND PROCESSES AND JIGS FOR ITS MANUFACTURING

(75) Inventors: Alberto Ramon Martinez Cerezo, Madrid (ES); Elena Arevalo Rodriguez, Madrid (ES); Jorge Juan Galiana Blanco, Madrid (ES); Francisco Javier Jordan Carnicero, Madrid (ES)

(73) Assignee: Airbus Espana, S.L., Madrid (ES)

( * ) Notice: Subject to any disclaimer, the term of this patent is extended or adjusted under 35 U.S.C. 154(b) by 346 days.

(21) Appl. No.: 11/589,680

(22) Filed: Oct. 30, 2006

(65) Prior Publication Data
US 2009/0217529 A1  Sep. 3, 2009

(30) Foreign Application Priority Data
Aug. 31, 2006  (ES) ............... PCT/ES2006/070131

(51) Int. Cl.
*B65H 81/00* (2006.01)
(52) U.S. Cl. .................. 156/169; 156/173; 156/175; 156/189; 156/192
(58) Field of Classification Search ............ 156/169, 156/173, 175, 184, 189, 192
See application file for complete search history.

(56) References Cited

U.S. PATENT DOCUMENTS

| | | | | |
|---|---|---|---|---|
| 3,754,717 A | * | 8/1973 | Saidla | 242/437.3 |
| 4,233,020 A | * | 11/1980 | Oswald | 425/471 |
| 5,223,067 A | * | 6/1993 | Hamamoto et al. | 156/173 |
| 5,266,137 A | * | 11/1993 | Hollingsworth | 156/156 |
| 6,613,258 B1 | * | 9/2003 | Maison et al. | 264/102 |
| 7,166,251 B2 | * | 1/2007 | Blankinship | 264/258 |
| 7,459,048 B2 | * | 12/2008 | Pham et al. | 156/173 |

* cited by examiner

*Primary Examiner*—Jeff H Aftergut

(57) ABSTRACT

The present invention relates to a tubular-shaped component (19) for an aeronautical fuselage made of composite materials comprising an outer skin (1) without joints having a cylindrical or cylindrical-conical shape, a plurality of stiffeners or stringers (2) longitudinally arranged in said outer skin (1) and a plurality of anchoring elements (3) for anchoring other elements to subsequently be incorporated transversally arranged between said stiffeners or stringers (2). The invention also comprises a jig (18) comprising a support body (12) and a plurality of panels (9) that can shift between an extended position (10) and a retracted position (10') in both directions and a process for manufacturing said component (19) in the last step of which once the tubular component (19) is formed and cured, it is separated from the jig (18) by means of a longitudinal movement after the shifting of those elements of the jig (18) preventing it, and particularly the panels (9) that can be shifted.

4 Claims, 7 Drawing Sheets

TUBULAR COMPONENTS FOR AERONAUTICAL FUSELAGES AND PROCESSES AND JIGS FOR ITS MANUFACTURING

FIELD OF THE INVENTION

The present invention relates to cylindrical or cylindrical-conical type tubular components of aeronautical fuselages made of composite materials formed by an outer skin without joints, longitudinal stiffeners or stringers and transverse ribs, and to processes and jigs for its manufacturing.

BACKGROUND OF THE INVENTION

In the aeronautical industry, weight is an essential aspect due to which optimized structures manufactured with composite materials are given priority over metallic structures.

The integration of smaller pieces into a larger assembly by using a lower number of operations and the simplification of the assembly process for the resulting pieces generally implies a great reduction of the number of pieces, of the weight of the structure and of the time and costs necessary for manufacture.

Automatic carbon fiber taping machines represent a huge advance with respect to manual operation and allow precisely taping large surfaces such as aeronautical surfaces.

In any case, the manufacturing of complete airplane fuselage sections with composite materials has its drawbacks given their dimensions, and because of this it has earned the attention in the art, which has made several proposals to that respect.

One of them, disclosed in U.S. Pat. No. 6,612,258 B1, consists of the manufacture of complete fuselage sections with longitudinal stiffeners and transverse ribs (and other components) without using an autoclave so as to be able to manufacture sections having larger dimensions than those that could be manufactured using standard sized autoclaves. This proposal involves on one hand the use of curing techniques outside the autoclave, and on the other hand complicated jigs making its application difficult.

Another proposal disclosed in patent application WO 2006/001860 A2 consists of manufacturing fuselage sections in a first step integrating longitudinal stiffeners and curing the composite material in an autoclave, and in a second step incorporating the transverse ribs. This process requires many jigs and lasts a rather long time.

SUMMARY OF THE INVENTION

An object of the present invention is to provide a tubular component for aeronautical fuselages facilitating the subsequent incorporation of transverse ribs, therefore simplifying the fuselage manufacture.

Another object of the present invention is to provide an efficient process for manufacturing the aforementioned component.

Another object of the present invention is to provide a jig for carrying out the aforementioned process that does not require being removed in each production cycle so as to be able to withdraw the tubular component.

These and other objects of the present invention are achieved by means of a tubular-shaped component for an aeronautical fuselage made of composite materials comprising an outer skin without joints with a cylindrical or cylindrical-conical shape, a plurality of stiffeners or stringers longitudinally arranged in said outer skin and a plurality of anchoring elements for anchoring other elements to be subsequently incorporated, transversely arranged between said stiffeners or stringers.

This component is manufactured by means of a process comprising the following steps:

Providing a jig with an outer surface having a shape similar to the inner surface of the tubular component including slots for housing the stiffeners or stringers and the anchoring elements.

Providing the stiffeners or stringers and anchoring elements and arranging them in said slots.

Laminating the outer skin on the jig.

Applying an autoclave curing cycle to the assembly of the jig and the tubular component formed thereon provided with a curing membrane.

Extracting the tubular component by means of a longitudinal movement after the shifting of those elements of the jig that prevent it.

The invention in turn provides a jig for implementing said process comprising a support body and a plurality of panels that can shift between an extended position and a retracted position in both directions, being configured such that:

The outer surface of the jig with the panels in the extended position has a shape similar to that of the inner surface of the tubular component, including slots for housing the stiffeners and anchoring elements.

The panels can shift from the extended position to the retracted position without interfering with any element of the tubular component.

Other features and advantages of the present invention will be understood from the following detailed description of illustrative embodiments of its object in relation to the attached drawings.

DETAILED DESCRIPTION OF THE INVENTION

An embodiment of the invention shall be described below in relation to a cylindrical or cylindrical-conical-type tubular-shaped component 19 made of a composite material formed by a skin 1, a plurality of omega-shaped stiffeners 2 arranged longitudinally and a plurality of anchoring elements 3 with I-shaped profiles arranged transversally.

Figure 1:
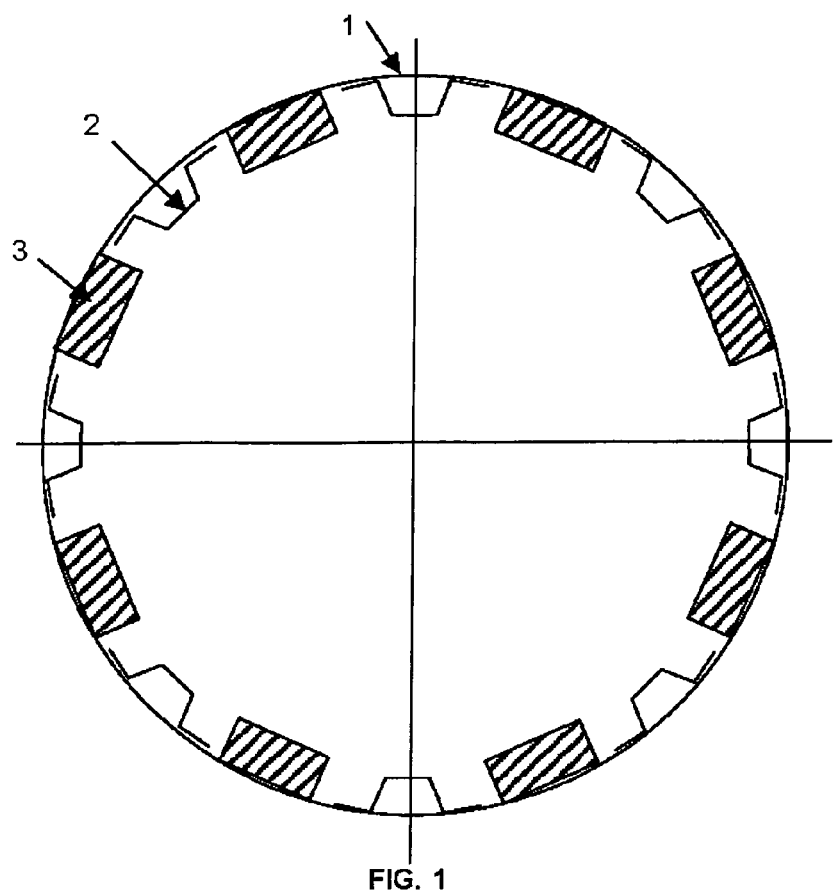
FIG. 1 shows a schematic cross-section view of a tubular component according to the present invention formed by a skin, longitudinal stiffeners or stringers and transverse rib anchors.
Figure 2:
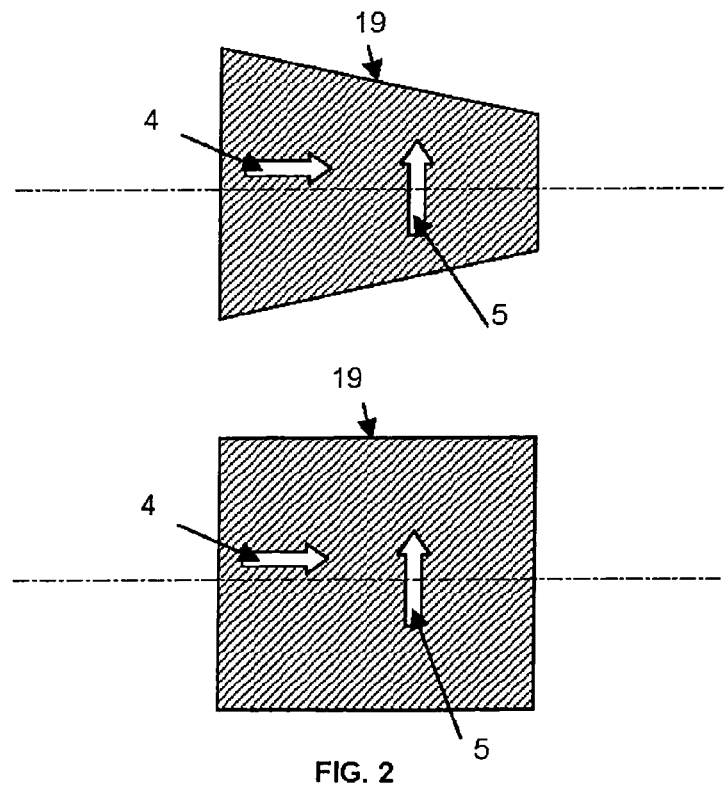
FIG. 2 shows schematic side views of cylindrical or cylindrical-conical type tubular components illustrating the longitudinal and transverse directions mentioned in the description of the present invention.
Figure 3:
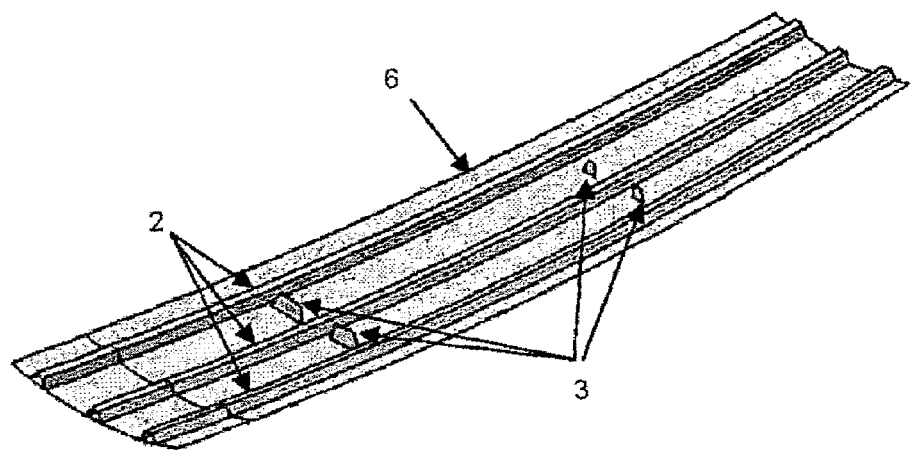
FIG. 3 shows a perspective view of a section of a tubular component according to the present invention formed by a skin, longitudinal stiffeners or stringers and transverse rib anchors.
Figure 4:
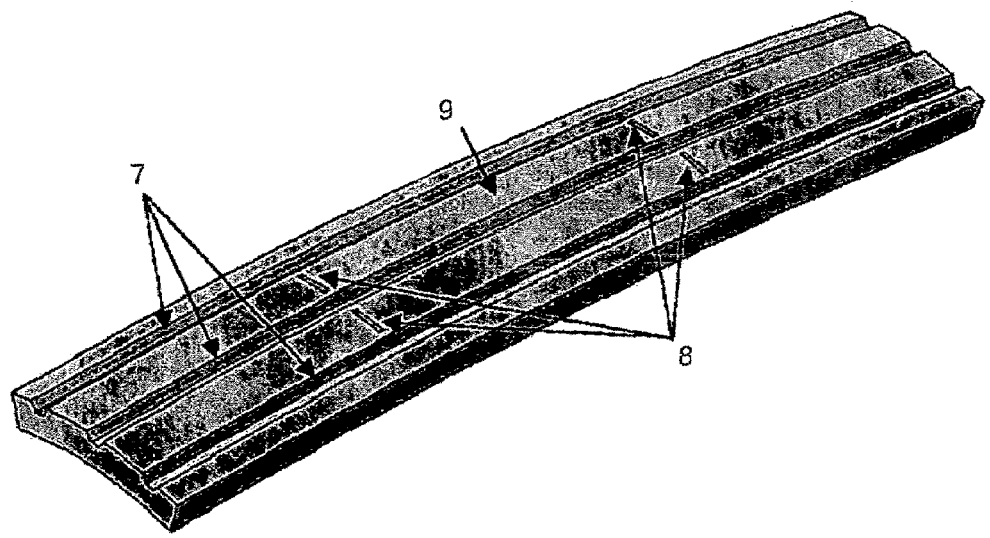
FIG. 4 shows a perspective view of a section of a panel of the jig object of the present invention in which can be seen the slots where the longitudinal stiffeners and the transverse rib anchors are inserted.
Figure 5:
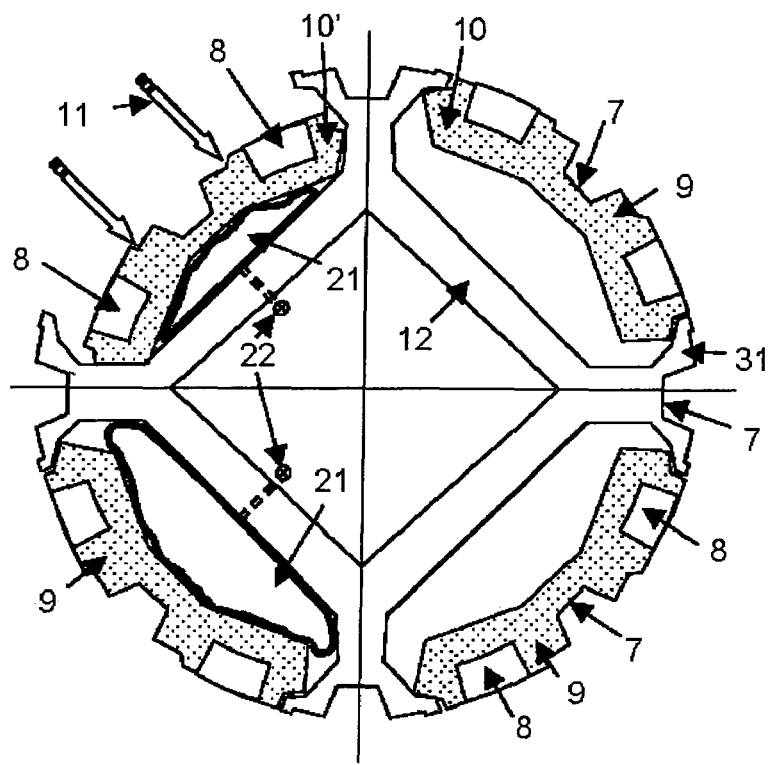
FIG. 5 shows a schematic view of the jig object of the present invention in which the support body and the panels forming it can be seen, three of them being in the extended position and one in the retracted position.
Figure 6:
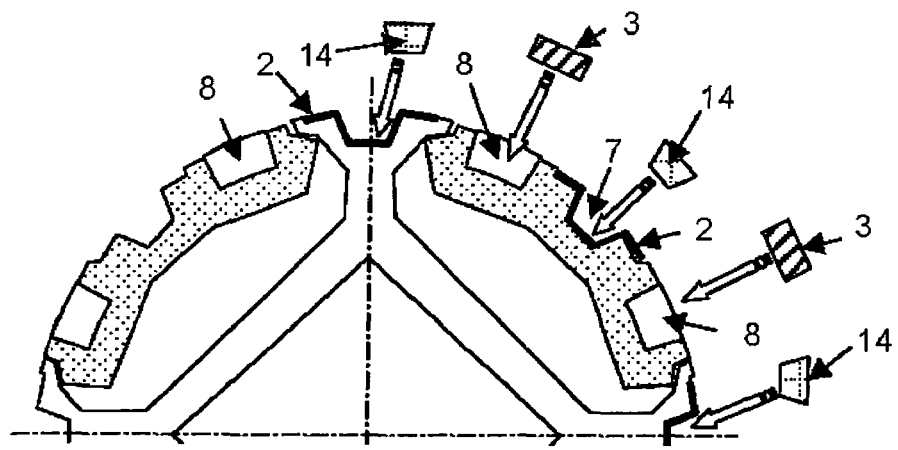
FIG. 6 shows the arrangement of the longitudinal stiffeners or stringers, the transverse rib anchors and the auxiliary male elements in the corresponding slots of the jig object of the present invention.

For the purpose of the present invention, the term stiffener or stringer comprises any element integrated with the skin 1 having a stiffening function and arranged in the direction indicated by the arrow 4 of FIG. 2, i.e. in a direction parallel to the axis of the tubular component 19.

For the purpose of the present invention, the term anchoring element 3 comprises any element integrated with the skin 1 with a function of supporting a structural element such as a rib to be subsequently incorporated and usually arranged in a direction parallel to the direction indicated by the arrow 5 of FIG. 2, although any person skilled in the art will understand that they would not necessarily have to be arranged in a direction that is strictly perpendicular to that of the stiffeners or stringers, but certain deviations would be allowable.

For the purpose of the present invention, composite material is understood to be any material consisting of fibers or fiber bundles embedded in a thermosetting or thermoplastic resin matrix and particularly those based on epoxy resins and carbon fibers.

The jig 18 basically consists of a support body 12 on which several mobile panels 9 are located which, in the extended position 10 externally have the inner geometry of the tubular component 19 to be manufactured. The panels 9 can be freely retracted in the direction indicated by arrow 11 to a position 10' where there are no obstacles for extracting the tubular component 19 once it is cured in the direction of arrow 17.

The manufacturing process is based on locating the stiffeners or stringers 2 in the slots 7 and the anchoring elements 3 in the slots 8 of the jig 18. If the stiffeners or stringers 2 are omega-shaped as shown in the Figures or another closed shape and the taping of the skin 1 is done with a machine having a pressure head 13, auxiliary male elements 14 are arranged inside the stiffeners 2 so that the resulting geometry is the surface on which the composite material forming the skin 1 is to be taped. In this step of the process, the jig 18 maintains the panels 9 in the extended position 10.

Figure 8:
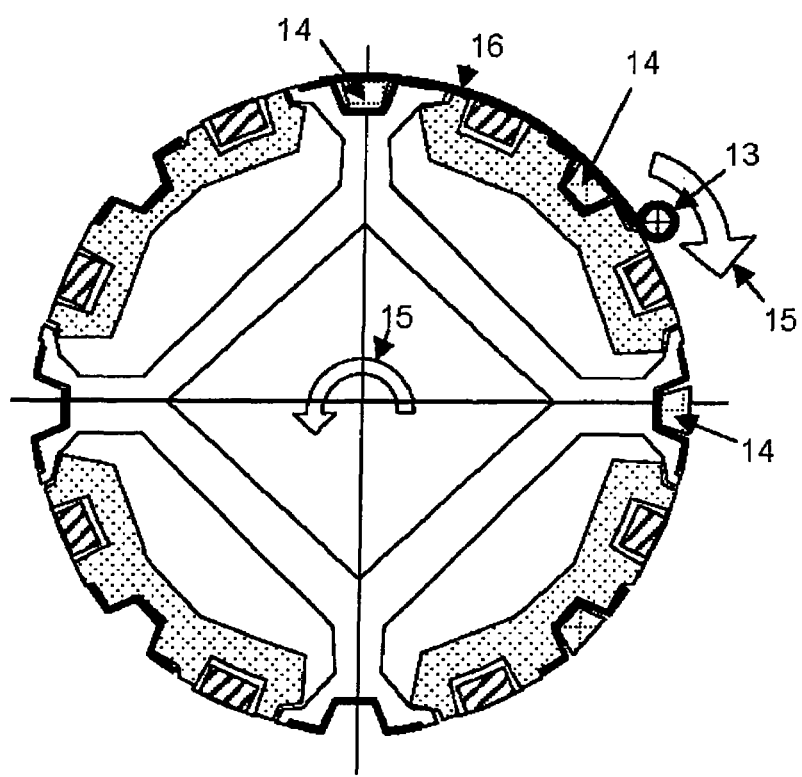
FIG. 8 shows the taping process for taping the skin on the jig object of the present invention.
Figure 9:
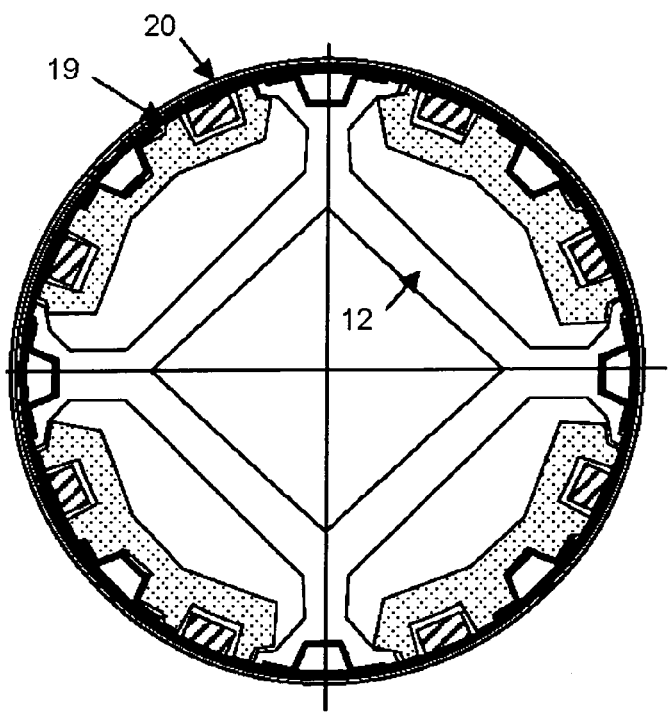
FIG. 9 shows a schematic view of the jig object of the present invention on which the tubular component and the outer curing membrane of composite materials are located.
Figure 10:
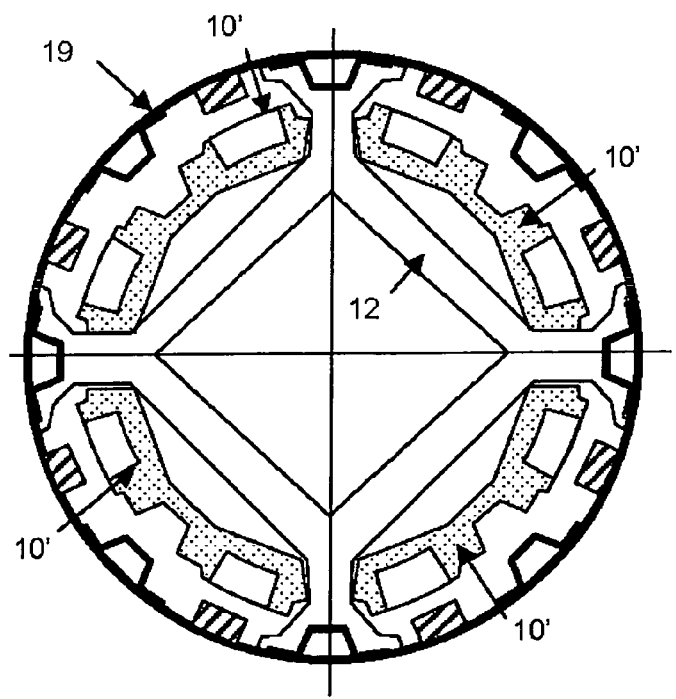
FIG. 10 shows a schematic view of the panels of the jig object of the present invention retracted in a magnitude that is greater than the height of the longitudinal stiffeners and transverse rib anchors.

Then the skin 1 is taped on the resulting surface. When an automatic machine is used in the taping process, relative movement (arrow 15, FIG. 8) between the jig 18 and the head 13 for laying the composite material 16 of the skin 1 occurs.

To cure the tubular component 19 on the jig 18 using pressure and temperature, a membrane 20 is externally placed and sealed against the support body 12 of the jig 18.

Figure 11:
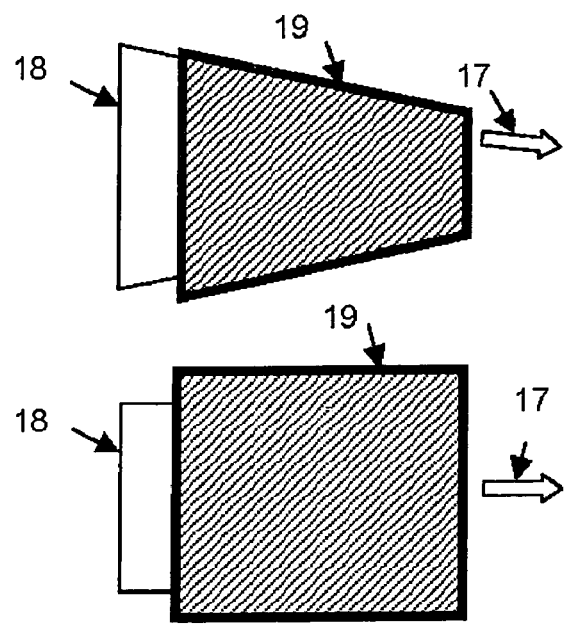
FIG. 11 shows schematic views of the extraction process for extracting cylindrical or cylindrical-conical-type tubular components from the jig.

After the curing process carried out in a conventional manner in an autoclave, it is necessary to extract the tubular component 19 from the jig 18. For this purpose the panels 9 are shifted to their retracted position 10' such that the stiffeners or stringers 2 and the anchoring elements are outside their slots 7 and 8 and do not hinder the extraction in the direction indicated by arrow 17 in FIG. 11.

In the embodiment shown in FIGS. 5-10, the jig 18 comprises four panels 9 having a sectional shape which, in the extended position, occupy most of the outer surface of the jig 18 and a support body 12 with four areas whose external parts 31 occupy the rest of the outer surface of the jig 18. In this embodiment, it is possible to extract the tubular component 19 after retracting the panels 9 despite being in contact with said areas 31 because, for example, said tubular component is cone-shaped making it possible, or because the extraction can be carried out by bending the tubular component 19 in the areas free of contact after the retraction of the panels 9.

Figure 12:
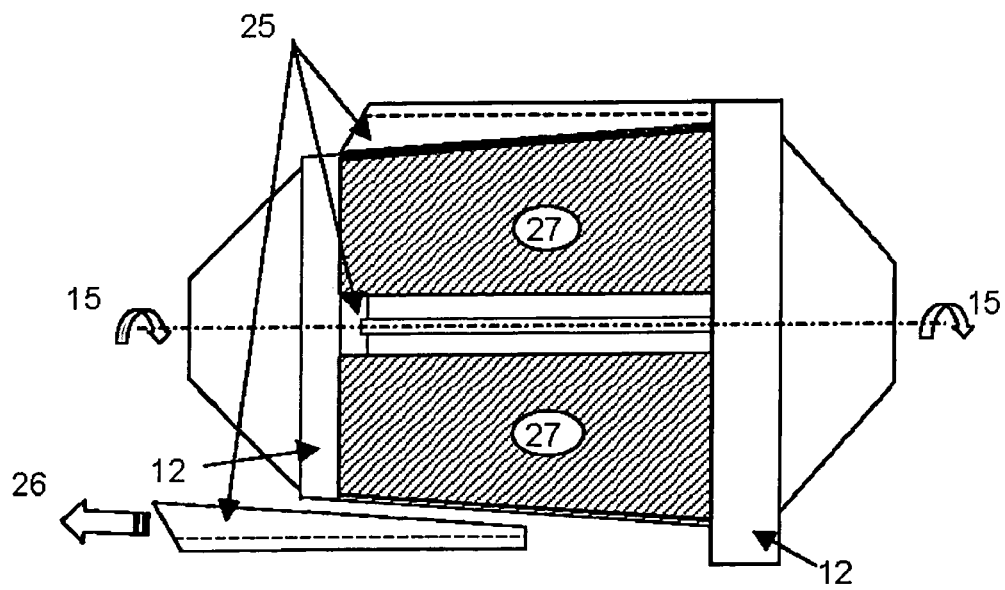
FIG. 12 shows a schematic view of the jig object of the present invention on which a possible configuration of the areas of the support body in contact with the tubular component, its removal direction and the regions of the jig occupied by the retractable panels is shown.
Figure 13A:
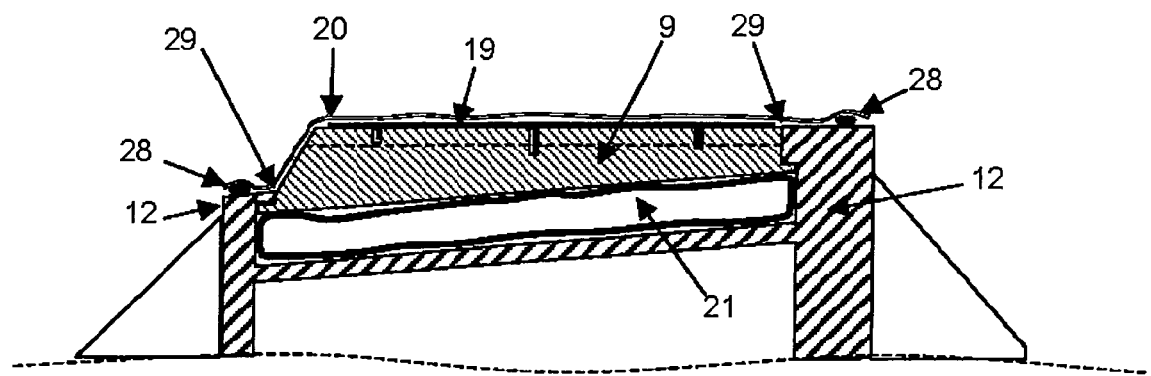
FIG. 13 shows two views of a schematic section of the jig object of the present invention, which illustrate a possible constructive configuration thereof. The first view shows the jig with the panels in the extended position, illustrating the interface where the resin is retained and the area where the vacuum sealing is carried out. The second view shows the jig with the panels in the retracted position, illustrating the manner in which the extraction of the tubular component is carried out, overcoming the obstacle of the transverse rib anchors.
Figure 13B:
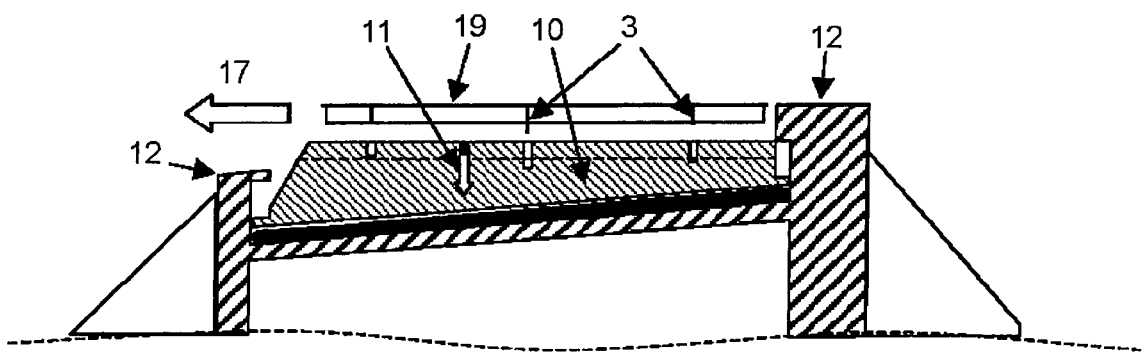

In the embodiment shown in FIG. 12, the support body 12 of the jig 18 comprises removable sections 25 between every two panels 9. In this case, the moving panels 9 in the extended position 10 together with all the removable sections 25 externally have the inner geometry of the tubular component 19 to be manufactured. As in the previously described embodiment, the panels 9 can be freely retracted in the direction indicated by arrow 11 to a position 10' where there are no obstacles for the extraction of the cured tubular component 19 in the direction of arrow 17 and, in contrast, the removable sections 25 can be shifted with respect to the support body 12 in the direction indicated by arrow 26 to a position where they are not an obstacle for extracting the tubular component 19.

In both embodiments the slots 8 of the anchoring elements can only be located in the panels 9.

Figure 7:
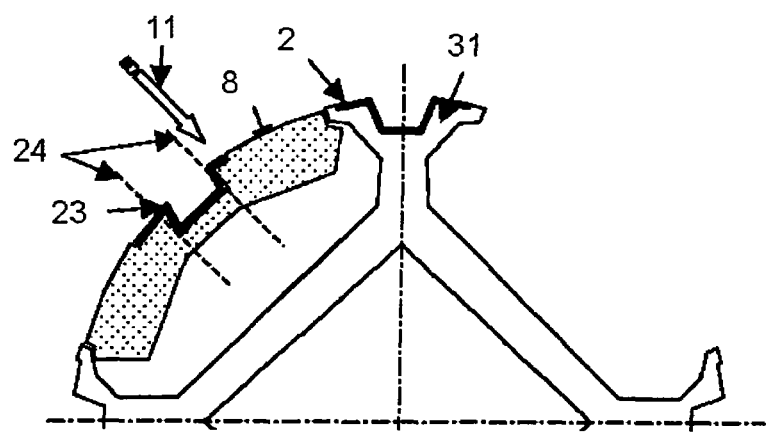
FIG. 7 shows a case of incompatibility between the shape of the longitudinal stiffener or stringer and the configuration of a panel of the jig, given that one part of the stiffener or stringer intersects the retraction direction of the panel and prevents this movement.

The retraction movement for retracting the panels 9 in the direction indicated by arrow 11 (see FIG. 5) can be guided by elements fixed in the support body 12 to assure a correct taping position and collision-free movement. The retraction direction 11 to retract the panels 9 conditions the design of the slots 7 and 8 and at the same time the design of the stiffeners 2 and anchoring elements 3. As is shown in FIG. 7, the shape of the stiffener or stringer 23 represented in this figure would interfere with the retraction movement for retracting the panels 9 in the direction indicated by arrow 11 and would prevent the extraction of the tubular component 19. In positive terms, the allowable shapes of the stiffeners or stringers 2 would be those which, considering a radial retraction direction 24 corresponding to in one embodiment of the present invention the halving of the section occupied by each panel 9 and perpendicular to the axis of rotation 15 of the jig 18, have a surface that will be completely illuminated by a hypothetical focus located in infinity according to the direction 24 which projects light towards the stiffener or stringer 2 against the panel 1.

However, the retraction direction 11 to retract the panels 9 is conditioned by their number and the angular section covered by each one.

The support body 12 of the jig 18 is the element that secures the panels 9 in the correct position during the curing process.

The sealing of the interfaces 29 between the panels 9 and the support body 12 or the removable sections 25, or between the these and the support body 12 is not critical for the curing process for curing the composite material and only requires to avoid the flow of the liquid resin to the inside of the openings 27 of the support body 12 so as not to block the mobility of the parts during the process. The support body 12 has to be airtight in conditions for curing composite materials, and therefore the curing membrane 20 is sealed against the support 12 in areas 28 keeping all the other mobile elements in contact with the composite material confined. Given that the support body 12 is not an element with mobile parts, sealings do not need to be replaced with each manufacturing cycle.

As regards the shifting of the panels 9 between the extended position 10, in which the taping and curing operations for taping and curing the tubular component 19 are carried out, and the retracted position 10', in which the tubular component is extracted, it can be carried out pneumatically for example by connecting pneumatic cushions 21 to inner conduits 22 to the support body 12 through permanent seals.

In a preferred embodiment, the taping is done with a fiber placement machine and by rotating the jig 18 about its axis in the direction indicated by arrow 15.

In this step, the stiffeners or stringers 2 and rib anchors 3 must remain well secured and positioned while the rotations occur and before they are joined to the skin 1 by means of, for example, several strips around the jig 18. If the stiffeners or stringers 2 have closed shapes, as previously mentioned, they would require the use of auxiliary male elements 14, which would also have to be secured by said bands.

Any modifications comprised within the scope defined by the following claims can be introduced in the embodiments of the invention described above.

The invention claimed is:

1. A process for manufacturing a tubular-shaped component (19) for aeronautical fuselages made of composite materials comprising an outer skin (1) without joints having a cylindrical or cylindrical-conical shape, a plurality of stiffeners or stringers (2) longitudinally arranged in said outer skin (1) and a plurality of anchoring elements (3) for anchoring other elements to subsequently be incorporated to the tubular component (19), transversally arranged between said stiffeners or stringers (2), comprising the following steps:
   a) Providing a jig (18) with an outer surface having a shape similar to the inner surface of the tubular component (19) including slots (7, 8) for housing the stiffeners or stringers (2) and the anchoring elements (3), respectively;
   b) Providing the stiffeners or stringers (2) and anchoring elements (3) and arranging them in said slots (7, 8);
   c) Laminating the outer skin (1) on the jig (18);
   d) Applying an autoclave curing cycle to the assembly of the jig (18) and the tubular component (19) provided with a curing membrane (20);
   e) Extracting the tubular component (19) by means of a longitudinal movement after the shifting of those elements of the jig (18) which prevent it.

2. A process for manufacturing a tubular-shaped component (19) for aeronautical fuselages made of composite materials according to claim 1, wherein step c) is carried out with a fiber placement machine by rotating the jig (18) and using means to hold the stiffeners or stringers (2) and the anchoring elements (3) in their position.

3. A process for manufacturing a tubular-shaped component (19) for aeronautical fuselages made of composite materials according to claim 1, wherein the shifting of said elements of the jig (18) in step e) is carried out by retracting them in the radial direction (11) without removing them from the jig (18).

4. A process for manufacturing a tubular-shaped component (19) for aeronautical fuselages made of composite materials according to claim 1, wherein the shifting of part of said elements of the jig (18) in step e) is carried out by retracting them in the radial direction (11) without removing them from the jig (18), and the shifting of another part of said elements of the jig (18) is carried out in the longitudinal direction (17) after their removal from the jig (18).

* * * * *